United States Patent
Desmond et al.

(10) Patent No.: US 8,448,060 B2
(45) Date of Patent: May 21, 2013

(54) METHOD, SYSTEM AND SOFTWARE TOOL FOR PROCESSING AN ELECTRONIC FORM

(75) Inventors: Michael Desmond, Dublin (IE); Maire Kehoe, Wexford (IE); Stephen Renwick, Dublin (IE); Mark E. Wallace, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1233 days.

(21) Appl. No.: 11/322,037

(22) Filed: Dec. 29, 2005

(65) Prior Publication Data

US 2006/0224948 A1    Oct. 5, 2006

(30) Foreign Application Priority Data

Mar. 31, 2005   (GB) .................................. 0506508.1

(51) Int. Cl.
  *G06F 17/00*   (2006.01)
(52) U.S. Cl.
  USPC ............................ 715/223; 715/224; 715/234
(58) Field of Classification Search
  USPC ................. 715/115, 203, 255, 273, 221, 222, 715/223, 201, 207, 234, 224; 707/104.1, 707/999.104
  See application file for complete search history.

(56) References Cited

U.S. PATENT DOCUMENTS

| | | | |
|---|---|---|---|
| 5,619,635 A * | 4/1997 | Millman et al. ............... | 715/221 |
| 6,195,794 B1 * | 2/2001 | Buxton .......................... | 717/108 |
| 6,460,042 B1 * | 10/2002 | Hitchcock et al. ..................... | 1/1 |
| 6,748,425 B1 * | 6/2004 | Duffy et al. .................... | 709/217 |
| 6,950,981 B2 * | 9/2005 | Duffy et al. .................... | 715/222 |
| 7,032,170 B2 * | 4/2006 | Poulose et al. ................ | 715/222 |
| 7,197,515 B2 * | 3/2007 | Rivers-Moore et al. ....... | 707/200 |
| 7,203,663 B1 * | 4/2007 | Buisman et al. ................ | 705/38 |
| 7,275,216 B2 * | 9/2007 | Paoli et al. ..................... | 715/763 |
| 7,430,711 B2 * | 9/2008 | Rivers-Moore et al. ....... | 715/221 |
| 7,451,392 B1 * | 11/2008 | Chalecki et al. .............. | 715/234 |
| 2002/0116421 A1 * | 8/2002 | Fox et al. ....................... | 707/526 |
| 2002/0133517 A1 * | 9/2002 | Carlson et al. ................ | 707/513 |
| 2002/0194219 A1 * | 12/2002 | Bradley et al. ................ | 707/506 |
| 2003/0110443 A1 * | 6/2003 | Yankovich et al. ......... | 715/501.1 |
| 2003/0188260 A1 * | 10/2003 | Jensen et al. .................. | 715/505 |
| 2004/0003341 A1 * | 1/2004 | alSafadi et al. ............... | 715/500 |
| 2004/0039990 A1 * | 2/2004 | Bakar et al. ................... | 715/505 |
| 2004/0128624 A1 * | 7/2004 | Arellano et al. .............. | 715/530 |
| 2004/0153967 A1 * | 8/2004 | Bender et al. ................. | 715/513 |

(Continued)

OTHER PUBLICATIONS

An XHTML 2.0 Implementation, Pohja et al., Telecommunications Software and Multimedia Laboratory, Helsinki University of Technology, P. O. Box 5400, FI-02015 HUT, Finland, 2004, pp. 403-415.*

*Primary Examiner* — Stephen Hong
*Assistant Examiner* — Ahamed I Nazar
(74) *Attorney, Agent, or Firm* — Edward Choi; Hoffman Warnick LLC

(57) ABSTRACT

A method, system and software tool for processing an electronic form, represented by a form template including data and user interface elements, are provided. The form is rendered in accordance with the data and user interface elements of the loaded form template. A form viewer provides one or more graphic objects representing form controls. A composite template is created by adding, to the form template, an action element associated with each form control for which a graphic object is provided by the form viewer. The form is then processed according to the composite template and displayed to a user.

16 Claims, 4 Drawing Sheets

U.S. PATENT DOCUMENTS

| | | | |
|---|---|---|---|
| 2004/0205528 A1* | 10/2004 | Alexander | 715/505 |
| 2004/0205529 A1* | 10/2004 | Poulose et al. | 715/506 |
| 2004/0205533 A1* | 10/2004 | Lopata et al. | 715/507 |
| 2004/0237030 A1* | 11/2004 | Malkin | 715/505 |
| 2004/0268229 A1* | 12/2004 | Paoli et al. | 715/508 |
| 2005/0086581 A1* | 4/2005 | Bass et al. | 715/500.1 |
| 2006/0161646 A1* | 7/2006 | Chene et al. | 709/223 |
| 2006/0197982 A1* | 9/2006 | Bell et al. | 358/1.18 |
| 2007/0009158 A1* | 1/2007 | Geva et al. | 382/209 |
| 2007/0089048 A1* | 4/2007 | Lacey et al. | 715/505 |
| 2007/0192678 A1* | 8/2007 | Tang et al. | 715/505 |
| 2008/0222514 A1* | 9/2008 | Rivers-Moore et al. | 715/235 |
| 2010/0306644 A1* | 12/2010 | Underwood et al. | 715/234 |

\* cited by examiner

METHOD, SYSTEM AND SOFTWARE TOOL FOR PROCESSING AN ELECTRONIC FORM

CROSS-REFERENCE TO RELATED APPLICATIONS

The present application claims the benefit of co-pending British Patent Application No. 0506508.1, filed 31 Mar. 2005, which is hereby incorporated herein by reference.

(1) FIELD OF THE INVENTION

The present invention relates to the field of data processing and in particular to the display and processing of electronic forms.

(2) BACKGROUND OF THE INVENTION

Interactive web applications often require the use of electronic forms. There are multiple specifications for forms-based applications which describe the user interface, data model definition and associated processing model for forms-based applications. The following aspects of a forms-based application can be defined:

The data model for a form, which defines the data to be manipulated, the associated data types and any constraints that must be applied to the data;

The user interface (UI) for a form, which allows for user interaction with the data; and The processing model for a form, which defines actions to be performed based on events which occur during the form lifecycle and events raised.

Typically, the UI represents everything the user sees and the events they trigger on those controls. The form processor specifies, amongst other things, event processing, data binding and validation and support for submitting the completed form to a database.

The data model and user interface elements of the form can be provided in a markup language such as XML (extensible Markup Language) in the form of a template. The user interface of the template can be rendered for display of the form to a user. A form processor (often also called a form processing engine) uses the processing model prescribed by the specification to read and process user inputs to the form.

A form designer can create a user interface with controls that drive the associated form processing model, by linking a form action with a control event, for example by associating a 'form submit' action with a 'button clicked' event. The form designer can also associate actions with form lifecycle events, for example associate a 'set value' action with a 'form loaded' event. This association process is sometimes called binding.

Efforts are being made to standardize web forms such that a standard form processor can be used to process forms. One such standard is the XForms 1.0 specification, which is recommended by the World Wide Web Consortium (W3C), and which can be found at http://www.w3.org/TR/xforms/.

One problem that can arise is if the forms-based application wants to drive form processing using controls which are external to the form template, for example to provide a button in a toolbar which will trigger the submit action.

One known way to do this is to include a button form control in the form template and associate it with the form submit action. This would mean that for an application consisting of a large number of form templates each one would need to contain the same construct in a uniform manner to provide a consistent user experience. For example to provide a toolbar in the application every form template would have to include content representing the toolbar. Therefore to change the toolbar every single form template would have to be changed.

Consider the following example where the goal is to design a form 100, such as that shown in FIG. 2, with the following functionality:

1) A user can enter in address information for a set of customers; in this example by including text boxes for customer name 102, three address lines 104, 106, 108, city 110, state 112 and postal code 114;

2) Navigation is provided to view the previous and next address, in this example by forward and back buttons 1 and 2;

3) Options are provided to:

create a new address record (button 3);

save the current changes (button 4);

delete an address record (button 5);

duplicate an address record (button 6); and refresh the display with the last saved address records (button 7).

Here are some extracts which illustrate how this would be represented using a typical form definition language, such as XForms, for which this problem occurs.

The first section, shown below in Listing 1, represents the buttons which run along the top of the form.

Listing 1:

```
<xforms:trigger id="button1" style="image:url(previous.gif)">
    <xforms:action ev:event="DOMActivate">
    <xforms:setindex index="index(repeat_id '') –
    1"repeat="repeat_id"/>
    </xforms:action>
</xforms:trigger>
<xforms:trigger id="button2" image:url(next.gif)">
  <xforms:action ev:event="DOMActivate">
    <xforms:setindex index=" index(repeat_id '') +
    1"repeat="repeat_id"/>
  </xforms:action>
</xforms:trigger>
<xforms:trigger id="button3">
  <xforms:label >New</xforms:label>
  <xforms:action ev:event="DOMActivate">
    <ibmforms:insert/>
  </xforms:action>
</xforms:trigger>
<xforms:trigger id="button4">
  <xforms:label>Save</xforms:label>
  <xforms:action ev:event="DOMActivate">
    <xforms:send submission="defaultSubmit"/>
  </xforms:action>
</xforms:trigger>
  <xforms:trigger id="button5">
  <xforms:label>Delete</xforms:label>
  <xforms:action ev:event="DOMActivate">
   <xforms:delete repeat="repeat_id"/>
  </xforms:action>
</xforms:trigger>
<xforms:trigger id="button6">
  <xforms:label>Duplicate</xforms:label>
  <xforms:action ev:event="DOMActivate">
   <ibmforms:duplicate/>
  </xforms:action>
</xforms:trigger>
<xforms:trigger id="button7">
  <xforms:label>Refresh</xforms:label>
  <xforms:action ev:event="DOMActivate">
   <xforms:refresh/>
  </xforms:action>
</xforms:trigger>
```

The second section, shown below in Listing 2, represents the controls for entering the address information.

Listing 2:

```
<xforms:input id="edit1" ref="@NAME">
  <xforms:label>Name:</xforms:label>
</xforms:input>
<xforms:input id="edit3" ref="@ADDRESS1">
  <xforms:label>Address 1:</xforms:label>
</xforms:input>
<xforms:input id="edit4" ref="@ADDRESS2">
  <xforms:label>Address 2:</xforms:label>
  </xforms:input>
  <xforms:input id="edit5" ref="@ADDRESS3">
    <xforms:label>Address 3:</xforms:label>
  </xforms:input>
  <xforms:input id="edit6" ref="@CITY">
    <xforms:label>City:</xforms:label>
  </xforms:input>
  <xforms:input id="edit7" ref="@STATE">
    <xforms:label>State:</xforms:label>
  </xforms:input>
  <xforms:input id="edit8" ref="@POSTAL">
    <xforms:label>Postal:</xforms:label>
  </xforms:input>
```

If the form designer wants every form to have the same list of options i.e. previous record, next record, save, delete, etc. then every form template needs to contain the first section. Therefore, to change the options every single form template would have to be changed.

For example the addition of a reset button, would require the addition of an XForms trigger form control and an associated XForms reset action in every template. For an application consisting of a large number of form templates this would be a time consuming process.

An alternative solution would be to adapt the form processor to provide means for external user interface components to drive the form processing model. However, this would move away from the standard form processors, for example this would make an XForms Processor non-conformant with the XForms specification.

The present invention aims to address these problems.

SUMMARY OF THE INVENTION

A first aspect of the invention provides a method of processing an electronic form represented by a form template including data and user interface elements. The method comprises loading a form template, rendering a form in accordance with the data and user interface elements of the loaded form template, and providing one or more graphic objects representing form controls. A composite template is created by adding, to the loaded form template, an action element associated with each form control for which a graphic object is provided. The form is then processed according to the composite template and displayed to a user.

Typically the graphic objects are provided in the form of a frame or one or more control bars.

A second aspect of the invention provides a system for processing an electronic form represented by a form template including data and user interface elements. The system comprises template loader, form viewer, rendering component, action writer and form processor. The template loader is operable to load a form template. The form viewer is operable to provide one or more graphic objects representing form controls. The rendering component is operable to render a form in accordance with the data and user interface elements of a loaded form template. The action writer is operable to add dynamically, to the form template, an action element associated with each form control provided by the form viewer, and thereby create a composite template. The form processor is operable to process the form according to the composite template.

This invention provides a mechanism for allowing the component which renders the user interface and the component which implements the form processing model to act on different versions of form templates, while at the same time only requiring a single form template to be provided. The additional markup can include the required elements i.e. form controls and actions for the external interface to drive form processing. Therefore the form designer does not need to specifically add controls for the shared options such as previous record, next record, save, delete etc. to each template.

This extension mechanism allows additional shared options in the form of controls and actions to be included as part of the forms model processing but not included in the user interface.

If we take the previous example what this would mean is that the first section is dynamically added to each form template before input to the form processor, but is not used when creating the user interface.

The component which renders the user interface is only aware of the controls which are specific to the particular form template it is rendering i.e. for the example shown in FIG. 2, the controls for editing the address. The component which implements the form processing model is aware of the controls which represent the 'common' options contributed by the application and also the form-specific ones that are used for editing the address.

BRIEF DESCRIPTION OF THE DRAWINGS

Preferred embodiments of the present invention will now be described by way of example only, with reference to the accompanying drawings in which.

DESCRIPTION OF PARTICULAR EMBODIMENTS

Figure 1:
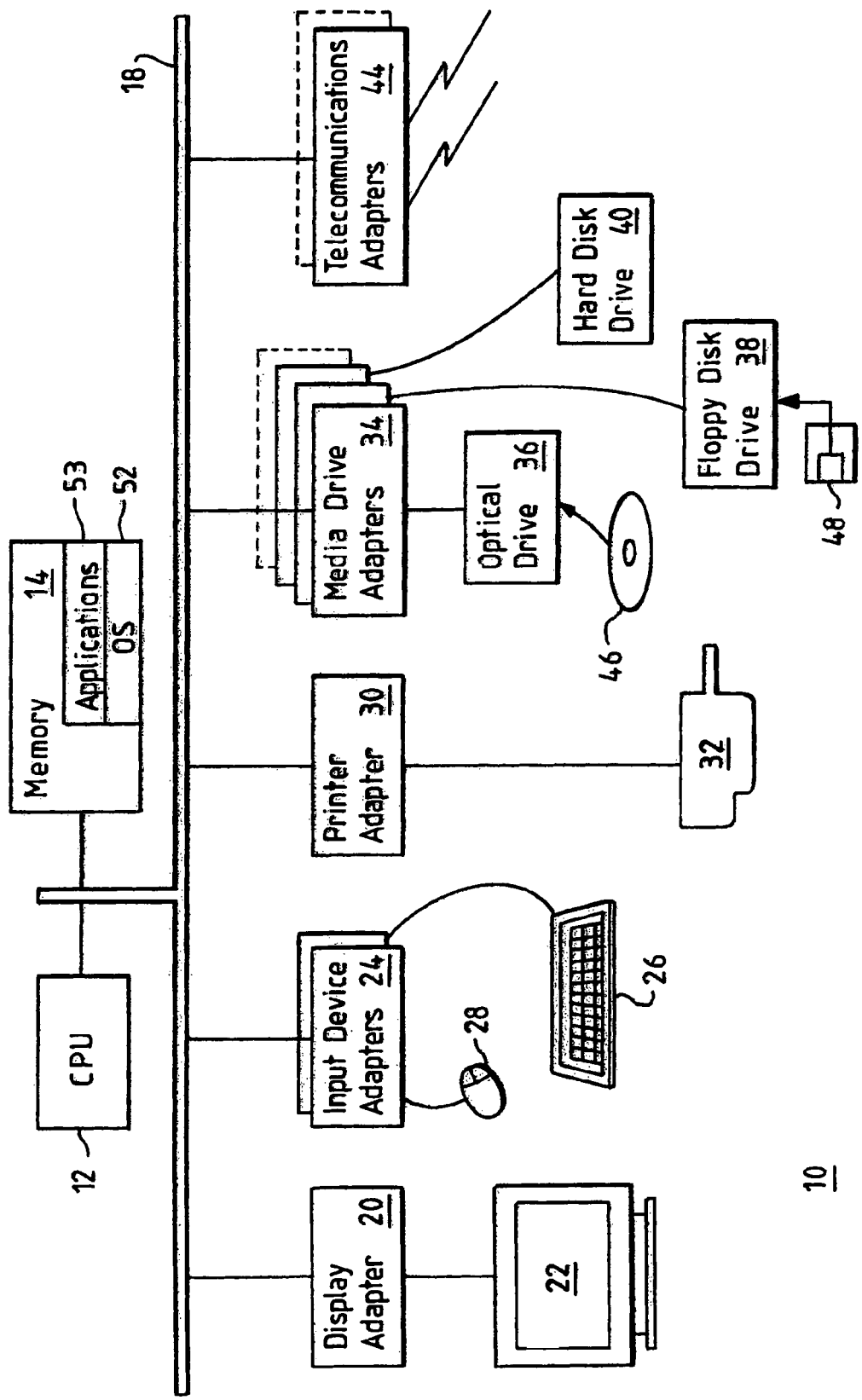
FIG. 1 shows a schematic representation of an illustrative implementation of a data processing system according to an embodiment of the invention.

Referring to FIG. 1, there is shown a schematic and simplified representation of an illustrative implementation of a data processing system 10. As shown in FIG. 1, the data processing system comprises a processor (CPU) 12, a memory 14 coupled to a bus structure 18. A display adapter 20 connects a display device 22 to the bus structure 18 and one or more user-input device adapters 24 connect the user-input devices such as the keyboard 26 and mouse 28 to the bus structure 18. An adapter 30 for the connection of a printer 32 may also be provided. One or more media drive adapters 34 are provided for connecting media drives, for example an optical disk drive 36, a floppy disk drive 38 and a hard disk drive 40, to the bus structure 42. One or more telecommunications adapters 44, such as a Local Area Network (LAN) adapter, a modem and/or ISDN terminal adapter, can be provided for connecting the data processing system to one or more networks or to other data processing systems.

It will be appreciated that FIG. 1 is a schematic representation of one possible implementation of a data processing system and that this may take many other forms. For example, data processing system 10 may be a non-PC type of computer which is Internet or network compatible, for example a web TV or set-top box for a domestic TV capable of providing access to a computer network such as the Internet. Optionally, the data processing system may be in the form of a wireless Personal Digital Assistant (PDA), or other wireless device. Data processing system 10 may comprise additional processing systems, with each processing system having additional components (or similar components with a different configuration). Moreover, the Input/Output devices shown in FIG. 1 are optional. Component parts of a data processing system may also be interconnected via methods other than a bus, such as a switch, for example. Presentation of a particular data processing system configuration is therefore not limiting on the scope of the invention.

A computer program for implementing various functions or for conveying information may be supplied on media such as one or more DVD/CD-ROMs 46 and/or floppy disks 48 and then stored on a hard disk, for example. The data processing system shown in FIG. 1 may be connected to a network such as the Internet, or a local or wide area dedicated or private network, for example.

A program implementable by a data processing system may also be supplied on a telecommunications medium, for example over a telecommunications network and/or the Internet, and embodied as an electronic signal. For a data processing system operating as a wireless terminal over a radio telephone network, the telecommunications medium may be a radio frequency carrier wave carrying suitable encoded signals representing the computer program and data. Optionally, the carrier wave may be an optical carrier wave for an optical fiber link or any other suitable carrier medium for a telecommunications system.

Illustrated within memory 14 in FIG. 1 are an operating system (OS) 52 and an application 53. Application 53 refers to one or more processes being currently run on the data processing system 10 (by the processor 12). Alternatively, application 53 could refer to a process being currently run on a separate data processing system connected to the data processing system 10. The OS is a software (or firmware) component of the data processing system 10 which provides an environment for the execution of programs by providing specific services to the programs including loading the programs into memory and running the programs. Application programs make requests for services to the OS through an application program interface (not shown).

In the preferred embodiment of the invention, application 53 is a forms-based application for displaying a form represented by a template including data and user interface elements, such as an XForms form, which will be used as an explanatory example.

The mechanism of the present invention allows the component which renders the user interface and the component which processes the form semantics to operate on different form content. The UI rendering component displays a user interface based on the core template, which represents the form as designed by its designer. A representation of extra form controls, in the form of a control button, taskbar, border etc., are provided by the application. So that the form processor knows how to deal with these, the template is expanded into a 'composite' template by the addition of action information relating to the extra controls, before it is passed to the form processor.

Figure 3:
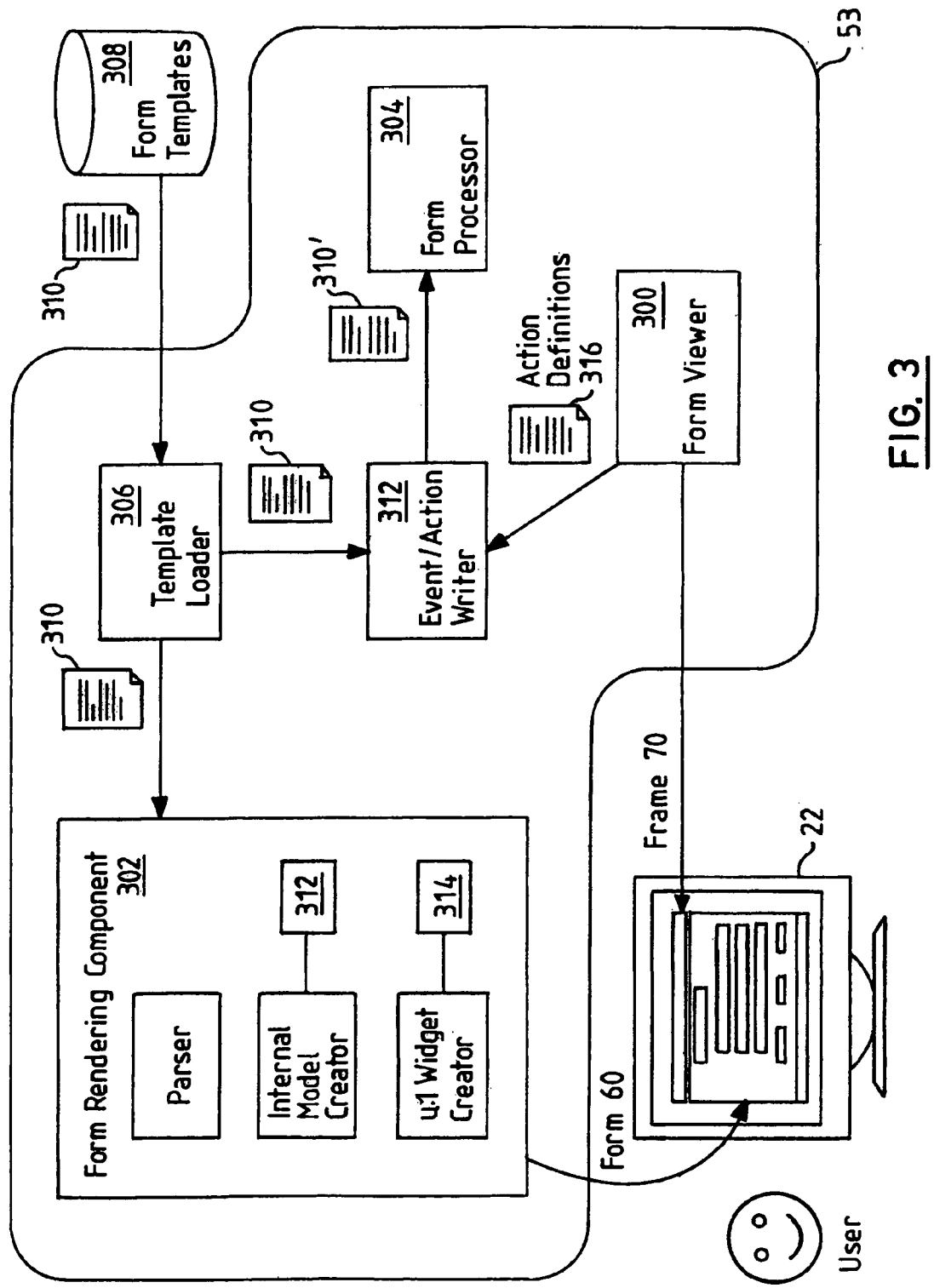
FIG. 3 shows an example of the components of a forms-based application according to an embodiment of the invention.

Referring to FIG. 3, the application 53 comprises the following components: form viewer 300, form renderer 302, event/action writer 312, and form processor 304. The form viewer is operable to provide one or more graphic objects of an external user interface, such as a frame or control bar, for forms displayed by the application 53. The rendering component is operable to render a form in accordance with the data and user interface elements of the template of the requested form. The form processor is operable to process a form according to a form template and its form processing model, for example an XForms processor implements the XForms processing model. The event/action writer adds content defining actions associated with form controls provided by the form viewer to a loaded form template 310, before it is passed to the form processor.

The application may also include a template loader 306 which is operable to load a core template 310 (shown in FIG. 3 as stored in repository 308). This template may be stored in any type of persistent storage, such as file system storage, relational database etc., and for example may be stored in the same database as the application data. The template may be retrieved by many different methods as will be appreciated by those skilled in the art, for example downloaded from another computer over a computer network.

Also shown in FIG. 3 is a display 22, which displays to a user graphic objects representing the form 60 provided by the rendering component and the frame/control bars 70 provided by the form viewer 300.

Figure 4:
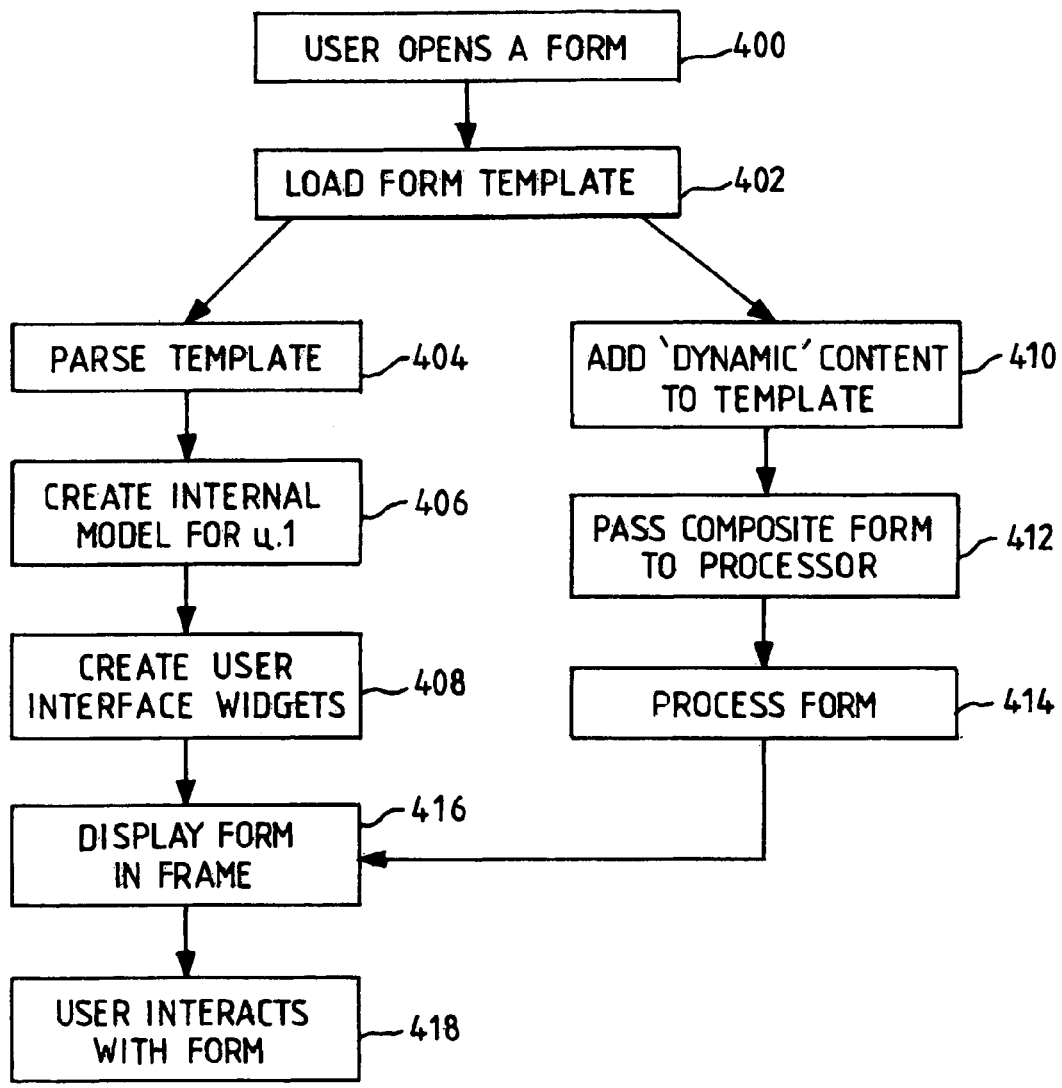
FIG. 4 shows a flowchart of the steps taken to display a form according to an embodiment of the invention.

The method of displaying the form to a user and of processing user interactions with the form will now be described in more detail, with reference to FIG. 4. When a user opens a form 400, the template for the form is loaded 402 by the template loader 306.

The loaded template 310 is passed to the rendering component 302, which parses 404 the template. In this embodiment the template is an XML file and the parser is a Document Object Model (DOM) parser which loads the file into a DOM Document object. Next the rendering unit creates 406 an internal model for the user interface. This is application specific and defines for each element of the template the user interface element to be used. For example, for each input data element specified in the template, the internal model may specify the use of a particular UI element such as an edit box, drop-down menu etc. In some systems this may be combined with the previous step, that is the parsing may directly generate the internal model for the user interface. A separate file 312 comprising user interface model definitions can be used to provide mappings between the elements of the form template and the elements of the internal model, which, for example, define that for input data elements of the template an edit box should be used. In one example JavaServer Pages (JSP) custom tags are used for this purpose to create a JavaServer Faces (JSF) view, (Java and all Java-based trademarks are trademarks of Sun Microsystems Inc).

The rendering component 302 then uses the internal model to create 408 user interface widgets, i.e. the controls that appear on the screen for the user to interact with. These widgets, for example, would define how an edit box is actually displayed. Again a separate file 314 can be used to provide mappings between the internal model elements and the user interface widgets. This can be used to allow the internal model to be reused across multiple platforms (where the actual UI widgets used would be different).

As there may be additional controls which are provided by the application and not defined in the core template, the core template 310 is also passed from the template loader to the event/action writer 312. The form viewer passes to the action writer action definitions 316, which may be stored locally or remotely, and which define the actions associated with the form controls provided by the form viewer. The action writer 312 interprets these definitions, and adds 410 additional markup to the template before it is passed to the form processor, as appropriate. The additional markup includes the required elements i.e. form controls and actions for the external interface (such as the control buttons provided by the application's form viewer) to drive form processing. The additional elements have specially name-spaced IDs so as not to conflict with IDs in the core form template i.e. controls which the form designer has added.

In the preferred embodiment the action definitions 316 are provided using Eclipse extension points (although other technologies can be used). Details of the Eclipse Project can be found at www.eclipse.org. An extension point for dynamically adding a runtime reset action for XForms would look something like this:

```
<runtimeAction
    namespaceURI="http://www.w3.org/2002/xforms"
    qualifiedName="xforms:trigger"
    id="com.ibm.workplace.dbtools.ui.resetTrigger"
    action="reset"
    event="DOMActivate"
    attributes=""
    location="//xhtml:body">
</runtimeAction>
```

The namespace URI and qualified name attributes are used to identify the new element that is added to the template. In the example above a new xforms:trigger element will be added. Triggers are UI controls that perform an action when activated. When activated, triggers fire off an XML event that is caught by the event handler associated with an action. The form action associated with the new element is identified, which in this example is the xforms:reset action. Thus when this trigger is activated, an event will be thrown which will be caught by an event handler which will invoke the <reset> action. Therefore if a request is made to the form processor to activate the reset trigger: com.ibm.workplace.dbtools.ui.resetTrigger, then the reset action will be invoked. Additional parameters for the action can be specified and finally the location where it needs to be added to the core form template is identified, using what is called an XPath expression.

The ID associated with the new element is specified. In the example above it is a fixed value, but this could also be a directive or left blank and a unique value would be computed at runtime, for example by retrieving all of the elements in the core form template which have an ID attribute and then generating a new unique ID for the elements which will be dynamically added.

At runtime, the new element and its specified attributes are added to the forms template before the form processor begins processing it. The action bar or external controls are thus dynamically bound to the new inserted elements and can be used to trigger the corresponding actions.

The expanded, or composite, version of the form is then passed 412 to the form processor, which performs form processing 414. Graphic objects representing the form 60 provided by the rendering component, and its external action bar 70, provided by the form viewer, are displayed 416. The user can then interact with the both the object rendered from the core template, as well as the 'external' controls provided by the form viewer.

Figure 2:
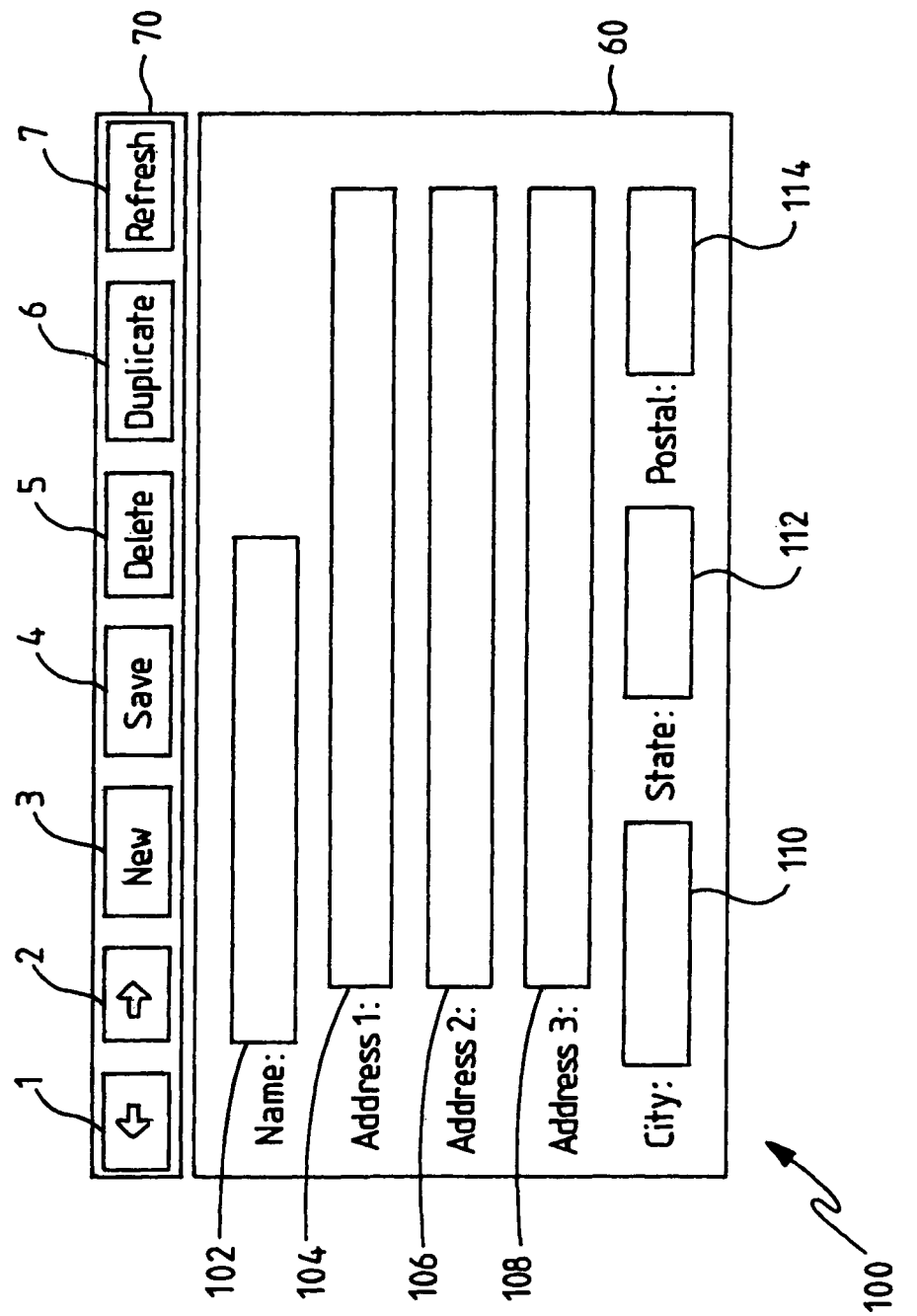
FIG. 2 shows an example of an electronic form that may be displayed to a user.

Suppose the form of FIG. 2, is displayed using this method, and the control bar 70 is provided by the application 53 using its form viewer, rather than being rendered from the user interface elements of a form template. When a user clicks 418 on one of the control buttons provided by the form viewer on the control bar 70, the form viewer passes the ID of the control button selected by the user to the form processor, which then executes the action associated with that ID.

User selection of a submit action typically initiates storage of any form instance data that has been entered by a user, such as name and address entries. This instance data may be stored locally, or may be sent to a back-end server or remote database for storage.

Although the present invention has been described in relation to the preceding example embodiments, the invention is not limited thereto and that there are many possible variations and modifications which fall within the scope of the invention. For example, the forms-based application may be a browser running on a computer system. Also, processes of the application may run on different computer systems such as client and server computer systems coupled via a network, or distributed among a plurality of computer systems. Templates and action definitions may be stored on client or server computer systems or at a separate storage location. Also, the frame data may be held on a server computer system and transmitted to a client, along with corresponding additional 'dynamic' template content.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of."

What is claimed is:

1. A system for processing an electronic form represented by a form template including data and user interface elements, the system comprising:
at least one computing device including:
a template loader operable to load a form template including data and at least one user interface element;
a form viewer operable to provide one or more graphic objects representing form controls of an external user interface;
a rendering component operable to render a form in accordance with the data and the at least one user interface element of the loaded form template, the rendering component including a Document Object Model (DOM) parser operable to parse and load the form template into a DOM document object;
an action writer operable to:
receive from the form viewer a definition of at least one action element associated with each form control provided by the form viewer; and
add dynamically, to the loaded form template, the at least one action element using a system of name-spaced identifications separate from name-spaced identifications of the form template, thereby creating a loaded composite template; and
a form processor operable to process the form according to the loaded composite template.

2. A system according to claim 1, wherein the form processor is operable to execute an action associated with a form control in response to detection of a user interaction with a graphic object representing said form control.

3. A system according to claim 1, further comprising a display for displaying the rendered form and any graphic objects provided by the form viewer.

4. A system according to claim 1, further comprising a form processing model according to which the form processor processes the form.

5. A system according to claim 1, further comprising a repository of form templates.

6. A method of processing an electronic form represented by a form template including data and user interface elements, the method comprising:
employing at least one computing device for:
loading a form template including data and at least one user interface element;
rendering a form in accordance with the data and the at least one user interface element of the loaded form template, including parsing the form template and loading the form template into a Document Object Model (DOM) document object;
providing at least one graphic object representing form controls of an external user interface;
dynamically adding to the loaded form template at least one action element associated with each form control provided using a system of name-spaced identifications separate from name-spaced identifications of the form template, thereby creating a loaded composite template; and
processing the form according to the loaded composite template.

7. A method according to claim 6, further comprising displaying the rendered form and the at least one graphic object.

8. A method according to claim 6, wherein processing the form comprises executing an action associated with a form control in response to detection of a user interaction with a graphic object representing said form control.

9. A method according to claim 6, further comprising providing a definition of the at least one action element.

10. A method according to claim 9, wherein the dynamically adding the at least one action element comprises adding markup to the loaded template in accordance with the definition provided.

11. A method according to claim 6, wherein processing the form uses a form processing model.

12. A method according to claim 6, further comprising creating an internal model for a user interface provided by the form.

13. A non-transitory computer-readable storage medium containing a program product, which when executed, processes an electronic form represented by a form template including data and user interface elements, the program product comprising:
program code for loading a form template including data and at least one user interface element;
program code for rendering a form in accordance with the data and the at least one user interface element of the loaded form template;
program code for parsing the form template and loading the form template into a Document Object Model (DOM) document object;
program code for providing at least one graphic object representing form controls of an external user interface;
program code for dynamically adding to the loaded form template at least one action element associated with each form control provided using a system of name-spaced identifications separate from name-spaced identifications of the form template, thereby creating a loaded composite template; and
program code for processing the form according to the loaded composite template.

14. The computer-readable storage medium of claim 13, wherein the program product further comprises:
program code for displaying the rendered form and the at least one graphic object.

15. The computer-readable storage medium of claim 13, wherein the program code for processing the form includes program code for executing an action associated with a form control in response to detection of a user interaction with a graphic object representing the form control.

16. The computer-readable storage medium of claim 13, wherein the program product further comprises:
program code for creating an internal model for a user interface provided by the form.

* * * * *